United States Patent [19]

Leslie et al.

[11] Patent Number: 4,820,474
[45] Date of Patent: Apr. 11, 1989

[54] PRESSURE SEAL STUD HOLE PLUG UNIT

[75] Inventors: Bruce E. Leslie, Baden; Paul N. Shadle, Kensington; Herman C. Wolf, Mars, all of Pa.

[73] Assignee: Thaxton, Inc., Mars, Pa.

[21] Appl. No.: 127,445

[22] Filed: Dec. 2, 1987

[51] Int. Cl.⁴ .................. G21C 13/06; F16J 15/00; B65D 53/00
[52] U.S. Cl. .................. 376/203; 376/463; 138/89; 220/235; 277/110; 277/113
[58] Field of Search .................. 376/203, 463, 260; 277/110, 113, 102; 138/89, 90; 220/235, 315

[56] References Cited

U.S. PATENT DOCUMENTS

| | | | |
|---|---|---|---|
| 1,910,994 | 5/1933 | Joyce | 277/110 |
| 1,987,135 | 1/1935 | Sugden | 277/110 |
| 2,744,775 | 5/1956 | Bredtschneider | 277/113 |
| 3,410,522 | 11/1968 | Daghe et al. | 277/110 |
| 3,855,003 | 10/1958 | Thaxton | 138/90 |
| 4,312,708 | 1/1982 | Leslie | 376/203 |
| 4,380,302 | 4/1983 | Broad | 220/235 |
| 4,381,800 | 5/1983 | Leslie | 138/90 |
| 4,611,485 | 9/1986 | Leslie | 138/90 |
| 4,671,518 | 6/1987 | Retz | 376/203 |
| 4,693,389 | 9/1987 | Kalen | 376/203 |
| 4,764,332 | 8/1988 | Guina | 376/203 |

OTHER PUBLICATIONS

Thaxton, Inc. advertisement, "Energy Systems Product News", Apr. 1978, 1 page.

Primary Examiner—Deborah L. Kyle
Assistant Examiner—Daniel Wasil
Attorney, Agent, or Firm—George C. Atwell

[57] ABSTRACT

A reactor stud hole plug unit having a mandrel with a central stem having a threaded upper portion, a longitudinal passageway extending therethrough and a mandrel plate attached to the lower end. The mandrel plate has threads on its periphery which engage internal threads on a stud hole in a nuclear reactor, and an annular stop is located at the upper end of the threads on the mandrel plate which engages a shoulder on the cavity when the mandrel plate is in position in a stud hole. A compression plate with a central opening having a diameter slightly larger than the diameter of the upper portion of the mandrel stem fits over the mandrel stem, and an annular sealing ring is positioned around the periphery of the mandrel plate above the annular shoulder and in contact with the compression plate when the compression plate is positioned over the mandrel stem. A drive nut is threadably engaged with the threads on the upper portion of the mandrel stem to force the compression plate toward the mandrel plate to compress the sealing ring and seal the stud hole.

9 Claims, 3 Drawing Sheets

PRESSURE SEAL STUD HOLE PLUG UNIT

FIELD OF THE INVENTION

The invention relates generally to stud hole plug units for use with nuclear reactors and more particularly to pressure seal stud hole plug units for sealing stud holes in a nuclear reactor when a temporary pressure seal is required.

DESCRIPTION OF THE PRIOR ART

During the refueling of nuclear reactors, the reactor closure head which is connected to the reactor vessel wall by a plurality of studs is removed so that the fuel rods can be replaced. The studs which attach the closure head to the wall of the reactor vessel are located around the periphery of the closure head and are screwed into internally threaded holes in the wall of the reactor vessel. When the studs are removed to remove the reactor head, it is necessary to plug the stud holes in order to prevent corrosion within the holes.

The prior art stud hole plug units are generally complex in construction and difficult to install. The O-ring seals in the prior art stud hole plug units are not always reliable and leakage into the stud holes may occur. Other standard prior art closure plugs cannot be utilized in a stud hole because they include metal expansion grips which would damage the wall and the internal threads of a stud hole when the grips are expanded. This is unacceptable because a stud must be reinstalled in the stud hole after the refueling operation is completed.

Downtime on a nuclear reactor is extremely expensive, and therefore it is important to perform the refueling operation as quickly as possible. The refueling operation can, nevertheless, take several weeks or longer, and the stud hole plug units must maintain the pressure seal for the duration of the refueling operation. Unnecessary delays in installation and removal of the stud hole plug units adds to the downtime of the reactor. The stud hole plug units must maintain a pressure of inert gas in the reactor vessel of up to approximately 40 feet of water, and it is therefore important that the stud hole seal is both repeatable and predictable.

An example of a stud hole plug unit is disclosed in U.S. Pat. No. 4,312,708 which is assigned to the assignee of the invention described and claimed herein. The stud hole plug unit disclosed in that patent provides a repeatable and predictable seal, but it cannot equalize the pressure between the interior of the reactor vessel cavity and the exterior of the reactor vessel cavity over a prolonged period of time.

SUMMARY OF THE INVENTION

The stud hole plug unit of the invention provides a positive, predictable and reproducible seal for each stud hole. In addition, the stud hole plug unit resists etching and corrosion and closes a stud hole which is to be pressurized.

The invention is a threaded pressure seal stud hole plug unit through which the stud hole cavity can be pressurized after the plug unit is installed without any concern about a blowout of the plug unit. The stud hole plug unit may be manufactured from either a stainless steel or a high energy radiation resistant plastic material such as polyethylene terephthalate. The invention includes tools for installing and removing the plug unit so that the unit can be quickly and tightly installed and quickly removed. Additionally, the design of the tools permits the stud hole cavity to be pressurized after the plug unit is in place without the necessity of removing the tools.

The stud hole cavity may be pressurized by a rigid pressurizing assembly having a push-on air chuck. A check valve is located at the upper end of the longitudinal passageway through the mandrel stem of the plug unit, and the push-on air chuck opens the check valve to permit rapid pressurization of the stud hole cavity after the plug unit is tightened in the stud hole.

The threaded pressure seal stud hole plug unit of the present invention has numerous advantages over prior art stud hole seals. It provides a positive seal for a stud hole and is capable of rapid installation and removal. The ability to pressurize the stud hole cavity through the plug unit eliminates seepage by equalizing the pressure on both sides of the plug unit annular seal without creating a blowout. The positive alignment between the annular seal and the surface of the stud hole eliminates misalignment of the plug unit with the internal threads of the stud hole and consequent stripping of the threads. The torque provided on the compression plate to compress the annular seal assures consistent reproducible leak-tight seals. The plug unit is light in weight so that it is unlikely that it will be dropped which could damage the internally threaded stud hole.

BRIEF DESCRIPTION OF THE DRAWINGS

In the following description of the drawings, like reference numerals refer to like parts.

DESCRIPTION OF THE PREFERRED EMBODIMENTS

Figure 1:
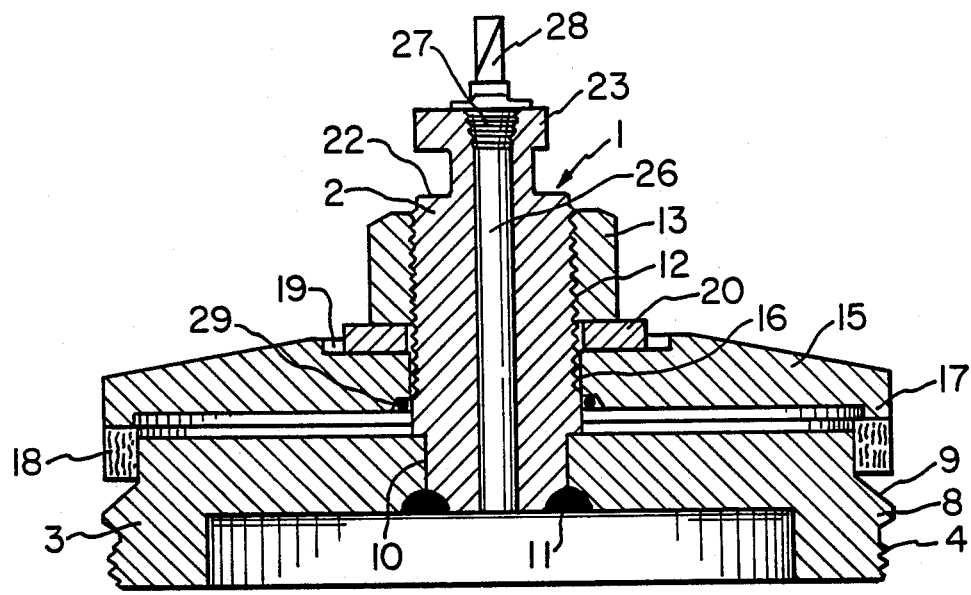
FIG. 1 is a vertical cross section through a pressure seal plug unit.
Figure 2:
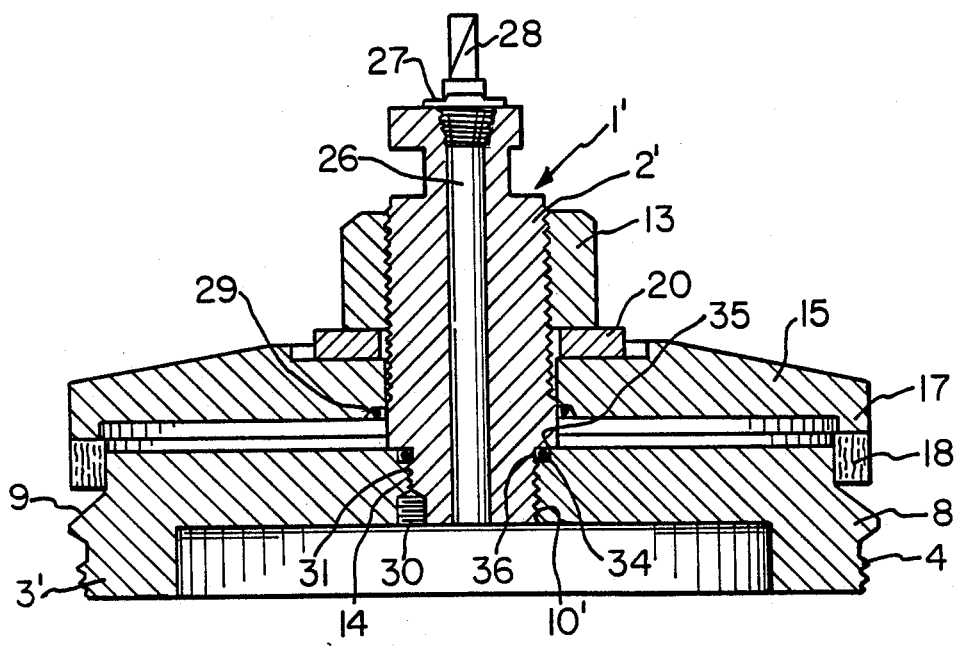
FIG. 2 is a vertical cross section through a modified pressure seal plug unit.
Figure 3:
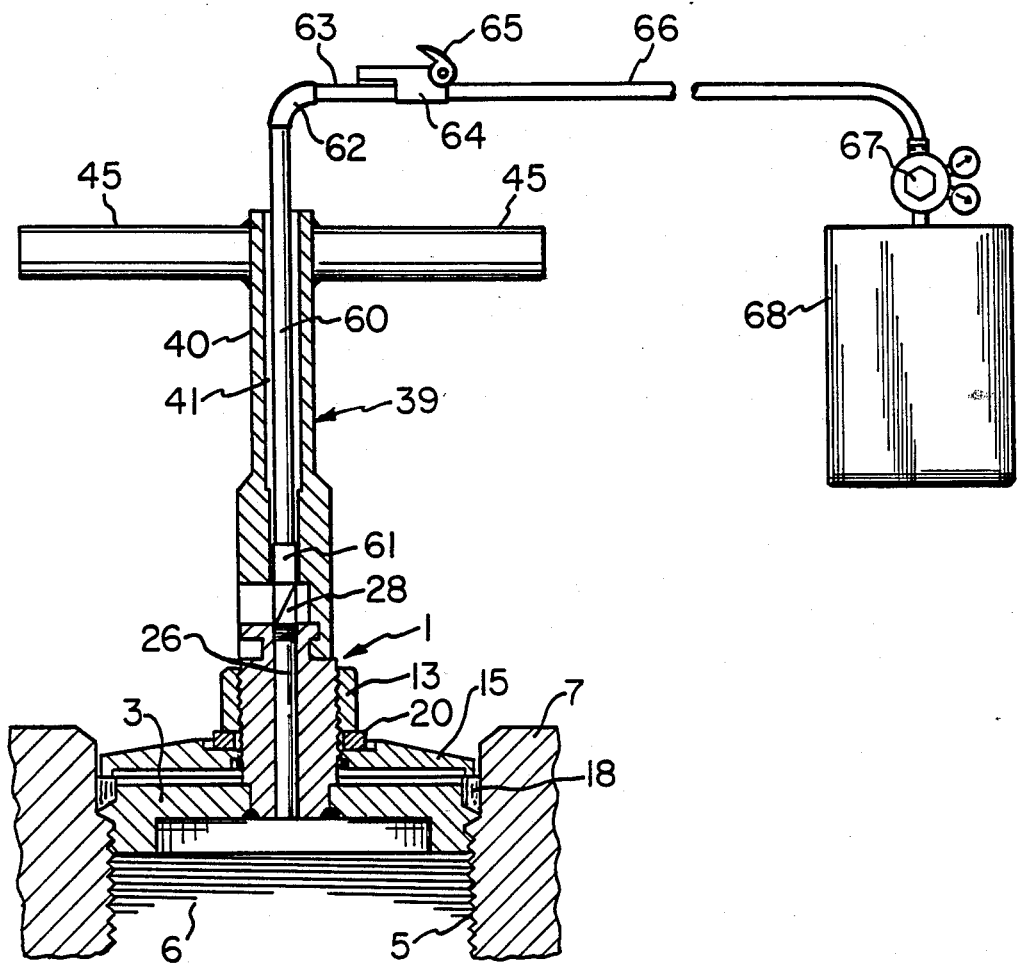
FIG. 3 is a vertical cross section through the plug unit shown in FIG. 1 installed in a stud hole with the pressurizing system and an installation tool in place.

The plug unit 1 shown in FIGS. 1 and 3 of the drawings includes a mandrel stem 2 having its lower end located within a central bore 10 in a cylindrical mandrel plate 3. The mandrel plate has external threads 4 on its periphery which are adapted to cooperate with the internal threads 5 in a stud hole 6 formed in the reactor wall 7 as shown in FIG. 3 of the drawings. An annular stop 8 is located on the periphery of mandrel plate 3 at the upper end of threads 4 to prevent the mandrel plate from being threaded too deeply into the stud hole. The upper surface 9 of the annular stop is formed with a downward angle for a purpose to be described hereinafter. An annular weld 11 is located at the lower end of mandrel stem 2 to attach the mandrel stem to the mandrel plate. The upper portion of the mandrel stem has a larger diameter than the lower end and is formed throughout most of its length with external threads 12 which receive a drive nut 13. A circular compression plate 15 having a central opening 16 with a slightly larger diameter than the external diameter of mandrel stem 2 fits over the mandrel stem as shown in FIGS. 1 and 2 of the drawings. The compression plate has an annular downwardly depending rim 17 at its outer edge. When the plug unit is assembled, the bottom surface of rim 17 contacts a halogen-free Buna-N elastomer annular sealing ring 18 which rests on the shoulder 8 of mandrel plate 3. When the compression plate is moved downwardly as described hereinafter, the rim 17 forces the sealing ring tightly against the upper angled surface 9 of stop 8 as shown in FIG. 3 of the drawings. The upper surface of compression plate 15 is formed with a central recess 19 which receives a washer 20. The opening in washer 20 has substantially the same diameter as the diameter of the central opening 16 through compression plate 15. The drive nut 13 is threaded on the external threads 12 of the mandrel stem 2, and when the drive nut is tightened, it forces compression plate 15 downwardly to compress sealing ring 18 to effect a tight seal between the plug unit 1 and the internal surface of stud hole 6. After sealing, the stud hole cavity can be pressurized in a manner to be explained hereinafter.

The upper end of mandrel stem 2 is formed with a shoulder 22 and an eccentric collar 23 having a short lobe 24, and a long lobe 25 is spaced from shoulder 22. The collar receives the tool shown in FIGS. 5–8 of the drawings to rotate the mandrel plate threads 4 in the internal threads 5 in stud hole 6. A longitudinal central bore 26 extends through mandrel stem 2, and the upper end of bore 26 is formed with internal threads 27 to receive a check valve 28. The check valve is a standard Schrader valve No. 36-42 with a core and cap. The plug unit shown in FIG. 1 of the drawings is machined from series 400 stainless steel and is then bright hardened to provide a surface resistant to etching and corrosion.

The plug unit shown in FIG. 2 of the drawings is basically the same as the plug unit shown in FIG. 1 of the drawings except that the plug unit 1' in FIG. 2 is made from polyethylene terephthalate (PET) and the mandrel stem 2' cannot be welded to the mandrel plate 3' as in the embodiment shown in FIG. 1. The annular weld 11 in the embodiment shown in FIG. 1 is replaced with a set screw 30 which is threaded into a hole formed by complementary 180° internally threaded notches in the lower end of mandrel stem 2' and mandrel plate 3'. Additionally, the lower end of the mandrel stem 2' is threaded at 14 to cooperate with threads formed in the central bore 10' of mandrel plate 3'. Since the stem is not welded to the plate in the embodiment shown in FIG. 2, an O-ring seal 34 is located between a shoulder 35 on the lower end of mandrel stem 2' adjacent the upper surface of the mandrel plate 3' and a complementary annular notch 36 formed in the upper end of the internally threaded bore 10' in the mandrel plate.

Figure 6:
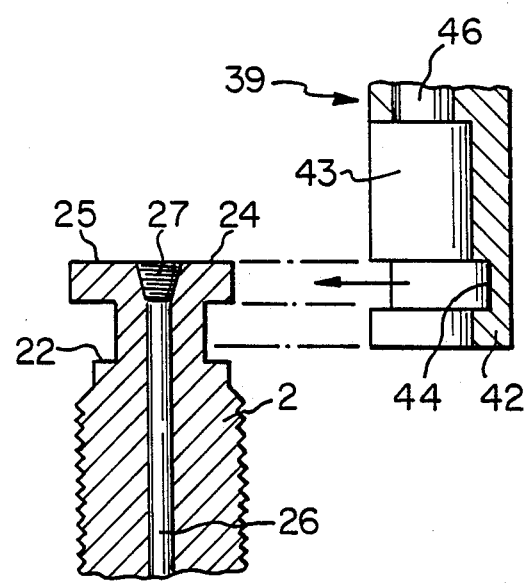
FIG. 6 is a partial vertical section through the upper end of the mandrel stem of the plug unit and the lower end of the tool shown in FIG. 5.

The installation tool shown in FIGS. 5–8 of the drawings is utilized to grasp the eccentric upper end of the mandrel stem in the embodiments of both FIGS. 1 and 2 of the drawings to rotate the mandrel stem and the mandrel plate to tighten and loosen the plug unit on the internal threads 5 of stud hole 6 in reactor wall 7. This installation tool consists of an elongated shaft 40 having a longitudinal passageway 41 extending therethrough and an open ended socket 42 at the lower end. The socket 42 is formed with an open recess 43 and a notch 44. The notch is spaced from the lower end of the socket and is offset as shown in FIG. 6 of the drawings. In operation the socket 42 is fitted over the short lobe 24 of eccentric collar 23 at the upper end of the mandrel stem so that the short lobe fits into notch 44. In this position, rotation of the handles 45 at the upper end of shaft 40 rotates the plug unit into and out of a threaded stud hole 6. The longitudinal passage 46 through socket 42 has a smaller diameter than the passageway through shaft 40 in order to guide the air chuck to the check valve of the upper end of the mandrel stem.

Figure 4:
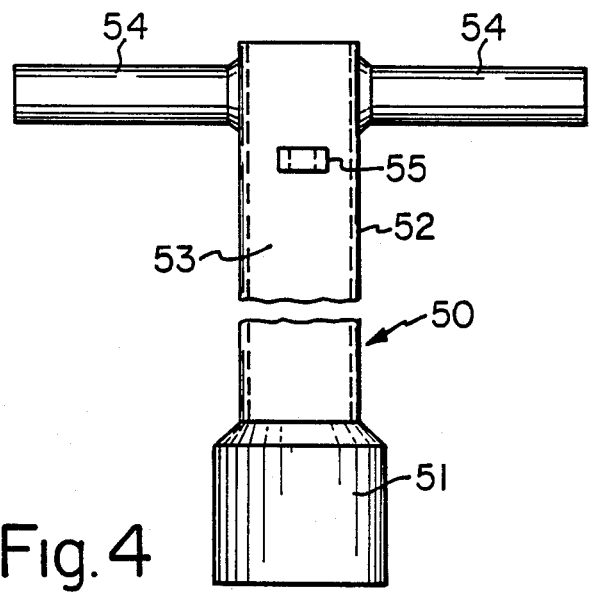
FIG. 4 is an elevation of the tool for rotating the drive nut for the compression plate of the plug unit.
Figure 5:
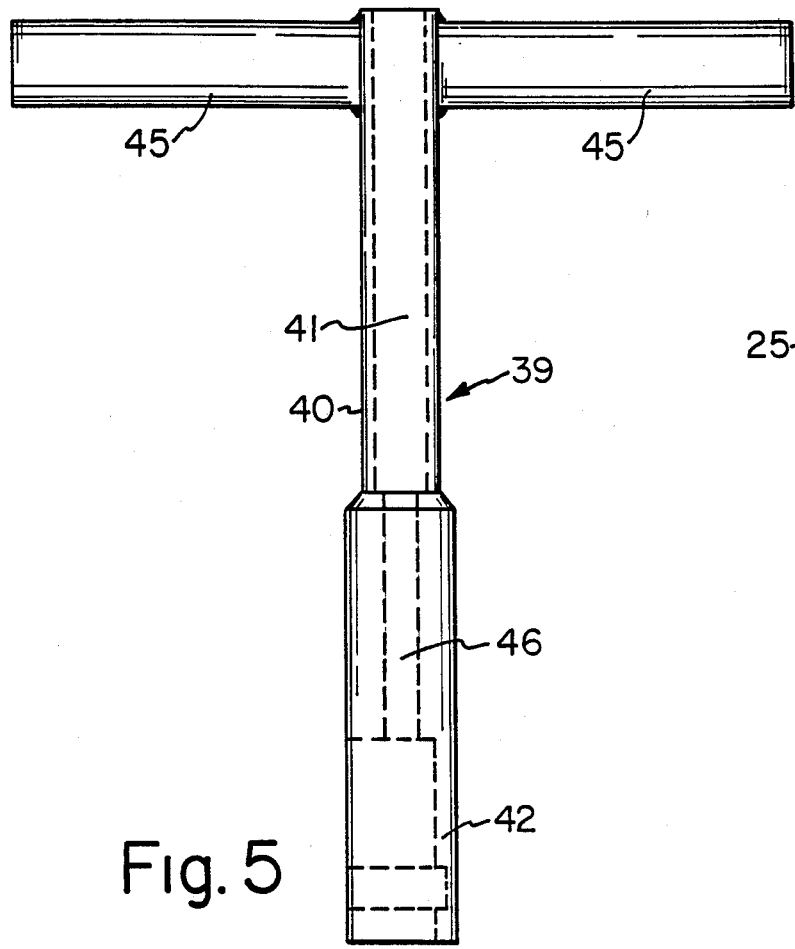
FIG. 5 is an elevation of the tool for rotating the mandrel of the plug unit.
Figure 8:
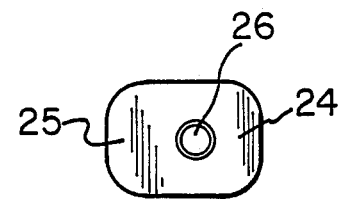
FIG. 8 is a top view of the mandrel stem of the plug unit shown in FIGS. 1 and 2.
Figure 7:
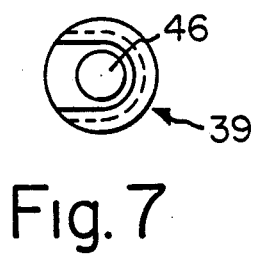
FIG. 7 is a bottom view of the tool shown in FIG. 5.

The tool 50 shown in FIG. 4 of the drawings has a tubular shank 52 with a hexagonal socket 51 attached to its lower end. The shank has a longitudinal passageway 53 extending throughout its length. The diameter of passageway 53 is larger than the external diameter of tool 39 so that the tool 39 can fit inside of tool 50. The upper end of shank 52 has handles 54 for rotating the tool. In operation, the hexagonal socket fits over drive nut 13 to rotate the drive nut and control the position of the compression plate 15 and the sealing ring 18. A socket 55 having a square opening (not shown) to receive a torque wrench is welded to the outside of the shank 52 adjacent to the upper end so that the drive nut can be tightened to the desired amount to compress the sealing ring 18.

The stud hole plug unit shown in FIG. 1 is installed by first assembling the nut 13, washer 20 and the compression plate 15 with sealing ring 18 in place around the periphery of mandrel plate 3 and the O-ring 29 in place. The tools shown in FIGS. 4–8 of the drawings are then placed together by inserting tool 39 through the passageway 53 in tool 50. The handles of the tools are held together, and the socket 43 on tool 39 is slid onto the upper end of mandrel stem 1. Tool 50 is then released to allow the socket 51 to drop onto drive nut 13. The tool 39 is rotated to rotate the plug unit and engage the threads 4 on mandrel plate 3 with the threads 5 on stud hole 6 and the mandrel plate is tightened until the stop 8 prevents further rotation of the mandrel plate. Tool 50 is now rotated to tighten the drive nut 13 on the threads 12 of mandrel stem 2 and seat sealing ring 18 to provide a pressure seal in the stud hole. The reverse procedure is followed to remove the plug unit from a stud hole. The pressure in the stud hole cavity must be relieved before the plug unit is loosened. When it is desired to remove the tools, tool 50 is lifted high enough to allow the socket 43 on tool 39 to slide out of engagement with the upper end of the mandrel stem of the plug unit and the tools are then raised together.

The plug unit shown in FIG. 2 of the drawings is assembled in the same way as the plug unit shown in FIG. 1 except that mandrel stem 2' is threaded into mandrel plate 3' after O-ring 34 is in place and set screw 30 is then inserted.

The stud hole cavity may be charged with pressurized inert gas through the check valve 28 with the tools in place, if desired. A rigid extension pipe 60 with a push-on air chuck 61 at one end and an elbow 62 at the other end is inserted through the longitudinal passageway 41 in tool 39, and contact between the air chuck and check valve 28 opens the check valve. The elbow 62 is connected to a pipe 63 which is attached to a standard control valve 64 having a hand lever 65. The inlet end of control valve 64 is attached to a hose 66 which is attached to a standard pressure regulator 67 mounted on the outlet of a pressurized tank 68 filled with inert gas. It will be obvious to one of ordinary skill in the art that after adjusting the pressure regulator valve 67 to the desired pressure and opening check valve 28 with the push-on air chuck 61, the operator need only depress hand lever 65 on control valve 64 to permit pressurized inert gas to flow from tank 68 through hose 66, valve 64, pipe 63, elbow 62 and pipe 60 to air chuck 61 to check valve 28. The gas flows through check valve 28 into the longitudinal passageway 26 in the mandrel stem of the plug unit into the stud hole cavity to pressurize the cavity.

While preferred embodiments of the invention have been described herein, it is to be understood that the invention may be embodied within the scope of the appended claims.

I claim:

1. A reactor stud hole plug unit comprising a mandrel having a central stem with a threaded upper portion and a lower portion having a diameter less than said upper portion, a longitudinal passageway extending through said stem, a mandrel plate fixed to the lower end of said stem, said mandrel plate having threads on its periphery adapted to engage with internal threads on a stud hole in a nuclear reactor, an annular stop at the upper end of said threads on said mandrel plate adapted to engage a shoulder on the stud hole when said mandrel plate is in position in the stud hole, a compression plate having an upper surface, a lower surface and a peripheral edge, a central opening through said compression plate having a diameter larger than the diameter of the upper portion of said mandrel stem so that said compression plate can fit over said mandrel stem, an annular sealing ring positioned about the periphery of said mandrel plate above said annular stop and in contact with said compression plate when said compression plate is placed over said mandrel stem, a drive nut threadably engaging the threads on the upper portion of said mandrel stem to maintain the stud hole plug unit in assembled relationship and adapted to force said compression plate toward said mandrel plate to compress said sealing ring so that said sealing ring substantially fills the space defined by the upper edge of said mandrel plate, the upper surface of said annular stop and the wall of the stud hole being plugged.

2. A stud hole plug unit as set forth in claim 1 wherein said mandrel stem is formed at its upper end with a means to be engaged by a tool for tightening said plug unit in a stud hole.

3. A stud hole plug unit as set forth in claim 1 wherein said sealing ring is rubber.

4. A stud hole plug unit as set forth in claim 1 wherein said mandrel stem and mandrel plate are made of stainless steel.

5. A stud hole plug unit as set forth in claim 1 wherein said mandrel stem and mandrel plate are made of polyethylene terephthalate.

6. A stud hole plug unit as set forth in claim 1 wherein said mandrel stem is attached to said mandrel plate by a weld.

7. A stud hole plug unit as set forth in claim 1 wherein the lower portion of said mandrel stem is threaded and said mandrel plate includes a threaded central bore to receive said threaded lower portion of said mandrel stem to attach said mandrel to said mandrel plate by a threaded connection and a set screw located between said mandrel stem and said mandrel plate after said mandrel stem has been threaded into the bore in said mandrel plate to prevent rotation of said mandrel stem relative to said mandrel plate.

8. A stud hole plug unit as set forth in claim 1 including a check valve connected at the upper end of said longitudinal passageway in said mandrel stem to permit pressurization of a cavity.

9. A stud hole plug unit as set forth in claim 2 wherein said means on said mandrel stem for receiving a tool consists of a shoulder on said mandrel stem, a longitudinal portion on the upper end of said stem above said shoulder having a smaller diameter than the upper portion of said mandrel stem and an eccentric collar located at the top of said smaller diameter portion spaced from said shoulder, said eccentric collar having a small lobe on one end and a large lobe on the other end, whereby said eccentric collar is adapted to be contacted by a tool to rotate said mandrel stem and said mandrel body.

* * * * *